May 2, 1933.  C. E. SUNDBERG  1,907,131

DASHPOT FOR TIME SWITCHES

Filed July 24, 1929

Inventor
Carl E. Sundberg
by Jas. H. Churchill
Atty.

Patented May 2, 1933

1,907,131

UNITED STATES PATENT OFFICE

CARL E. SUNDBERG, OF QUINCY, MASSACHUSETTS, ASSIGNOR TO ALBERT & J. M. ANDERSON MANUFACTURING COMPANY, OF SOUTH BOSTON, MASSACHUSETTS, A CORPORATION OF MASSACHUSETTS

DASHPOT FOR TIME SWITCHES

Application filed July 24, 1929. Serial No. 380,594.

This invention relates to apparatus for controlling the flow of gas, water, electricity or the like, wherein a movable member is capable of being moved into one position substantially in an instant and of being moved into another position after the lapse of a predetermined time.

The invention in the present instance is embodied in an apparatus for controlling an electric circuit, and has for its object to provide a simple, inexpensive and reliable apparatus in which provision is made for closing the circuit controller by manually moving a piston in one direction in its cylinder, and for opening the circuit controller after a lapse of time by moving the piston in the opposite direction at a different speed.

Provision is also made for varying the length of time the circuit controller remains closed to meet different conditions of use.

These and other features of this invention will be pointed out in the claims at the end of this specification.

Figure 1:
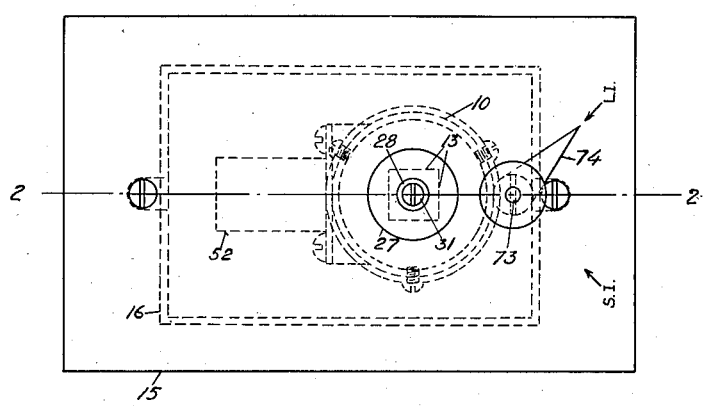
Figures 2, 3, 4, 5:
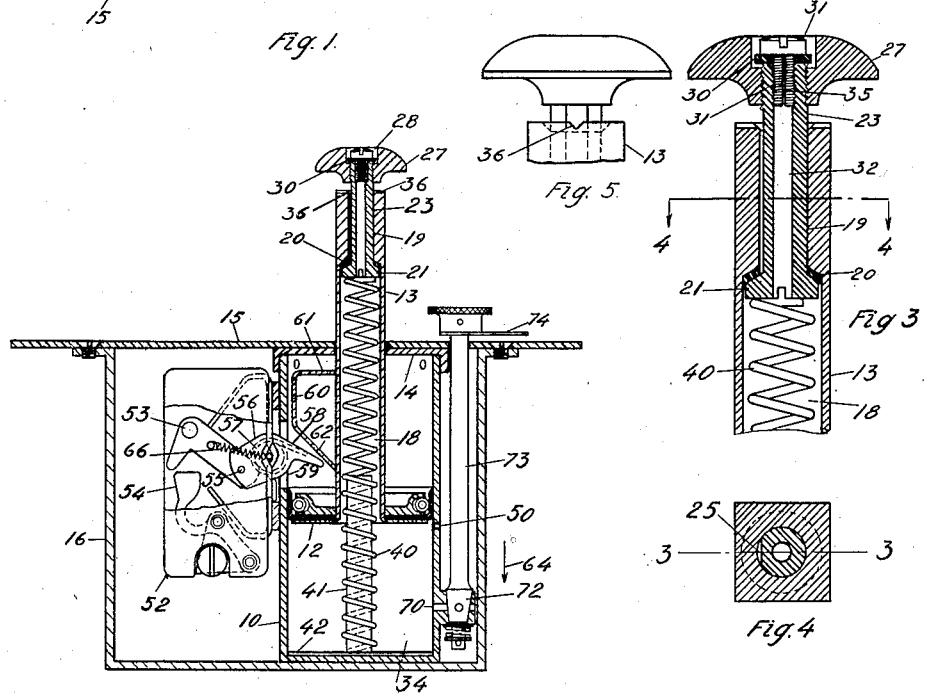

Fig. 1 is a plan view of one form of apparatus embodying this invention;

Fig. 2, a vertical section of the apparatus shown in Fig. 1;

Figs. 3, 4 and 5, enlarged details of parts of the apparatus shown in Figs. 1 and 2, Fig. 4 being a section on the line 4—4, Fig. 3.

Referring to the drawing, 10 represents a cylinder containing a piston 12 fitted airtight therein and provided with a hollow piston rod 13 which is extended through a head 14 of the cylinder and through a face plate 15 of a casing 16 in which the cylinder 12 is located.

The hollow piston rod 13 is provided with a relatively large bore 18 and with a smaller bore 19 whose inner end wall 20 forms a seat for a valve 21 by which communication between the said bores may be cut off.

The valve 21 co-operates with its seat to cut off the cylinder 10 below the piston 12 from the atmosphere for a purpose as will be described.

The stem 23 of the valve 21 projects beyond the end of the piston rod and is slabbed off at one side as shown in Fig. 4, to form between it and the inner wall of the smaller bore 19 of the hollow piston rod a passage 25 which connects the hollow piston rod 13 below the valve seat 20 with the atmosphere when the valve 21 is removed from its seat, which is effected by the operator pressing upon a button or head 27 on the valve stem 23.

The valve stem 23 is hollow and extends into a chamber 28 in the head 27, which chamber is in open communication with the atmosphere, and constitutes a valve chamber in which is located a valve for cutting off communication between the portion of the cylinder 10 below the piston and the atmosphere.

In the present instance, this valve is shown as a washer 30 of leather or other suitable material which is mounted on a screw 31 below the head thereof, and is designed to contact with the upper end of the hollow valve stem 23 when it is desired to prevent air passing through the bore 32 of the hollow valve stem into the chamber 34 or into the portion of the cylinder below the piston.

The screw 31 is split lengthwise to form a passage 35 for air into the hollow stem 23 when the screw is backed off so as to uncover more or less of the passage 35 and thereby regulate the admission of air into the chamber 34 of the cylinder, for a purpose as will be described.

The upper end of the hollow piston rod 13 is provided with a notch 36 (see Fig. 5), which constitutes an air-port for the passage of air out of the chamber 34 when the piston is forced downward in its cylinder by the operator pressing on the head 27, which is engaged with the upper end of the hollow piston rod 13 to move the latter, but does not close the air-port or notch 36, so that, when the air outlet valve 21 is opened by movement of the head 27 into contact with the hollow piston rod 13, air in the chamber 34 can pass out of the cylinder as the piston is moved toward the bottom of the cylinder.

The piston 12 may be automatically moved in the opposite direction by a spring 40 located in the cylinder and extended into the hollow piston rod 13 to engage the valve 21 and normally seat the same.

The lower end of the spring 40 may encircle a guiding rod 41 attached to a disk 42 located in the cylinder.

From the above description, it will be seen that the chamber 34 below the piston is provided with an air inlet formed by the hollow valve stem 23 and with an air outlet formed by the hollow piston rod 13 and the passages 25, 36.

It will also be seen that the air inlet is controlled by a valve comprising the split screw 31 and the washer 30, and that the volume of air admitted into the chamber 34 of the cylinder 10 may be controlled or regulated by exposing to the atmosphere more or less of the passage 35 in the screw 31.

It will also be seen that the air outlet for the chamber 34 is provided with a valve 21 which fits the bore 18 of the hollow piston rod 13 loosely, so that when the valve 21 is forced off its seat by the operator, air in the chamber 34 and in the hollow piston rod may pass through the passage 25 and notch 36 to the atmosphere, with the result that when the piston 12 has been moved to near the bottom of its cylinder, very little air will remain in the chamber 34 and bore 18.

On the return movement of the piston 12 by the spring 40, the piston creates a partial vacuum in the chamber 34, which resists the action of the spring 40 and delays the return for a predetermined lapsed time, which is regulated by adjusting the air inlet valve 31 so as to require a given time to elapse before sufficient air is admitted into the chamber 34 to reduce the vacuum sufficiently to permit the spring 40 to return the piston to near its starting position and uncover an air inlet port 50 in the body portion of the cylinder so as to admit a larger volume of air and effect a balance of the piston, which enables the spring 40 to complete its return movement at a quicker rate toward the end of said return movement.

The piston 12 movable into one position at one speed and movable into another position at a reduced speed, is utilized to operate a circuit controller or switch 52, a known construction of which is herein shown, and is provided with a movable contact member 53 which co-operates with a stationary contact member 54 in a manner well understood.

The movable contact member 53 is represented as a lever pivoted at 55 (see Fig. 2) and has connected to it one end of a movable member or lever 56, pivoted at 57 and having an arm 58 extended into the cylinder 10 above the piston 12 through a slot 59 in said cylinder.

The arm 58 is normally extended into the path of movement of a device which is movable with the piston.

In the present instance, this device is shown as a bracket which is suitably attached to the hollow piston rod 13 to move therewith and is provided with a vertical section 60, a horizontal section 61 and an inclined section 62.

The bracket and the arm 58 are arranged so that the latter is below the inclined section 62 when the switch or circuit controller is open as represented in Fig. 2. When the operator moves the piston downward in its cylinder in the direction indicated by the arrow 64, the inclined section 62 is engaged with the arm 58 and cants or turns the arm into a substantially vertical position out of the path of the bracket and allows the piston to be moved to the end of its stroke in the direction indicated by the arrow 64.

Movement of the arm 58 effects closure movement of the movable contact member 53 which is held in its closed position by the arm 58 engaging the vertical section 60 of the bracket.

The switch remains closed for a predetermined time, or until the piston has been returned to its normal or starting position by the spring 40, at which time the bracket is moved above the arm 58 and the latter is moved by a spring 66 into its starting position, represented in Fig. 2, and the movable contact member 53 is also moved into its open position.

Apparatus of the character described, is especially useful for controlling machines or apparatus operated by electric motors whose circuit is controlled by the switch, and as it may be desirable to operate the machine for different lengths of time according to the character of the work being performed by the machine or apparatus, provision is made for enabling the machine to be operated for different intervals of time.

In the present instance, this result is accomplished by providing the cylinder with an additional air inlet port 70 which is located between the port 50 and the bottom of the cylinder, so that a shorter interval of time is required for the piston to uncover the port 70 than is required to uncover the port 50.

To illustrate: Suppose that a washing machine is being controlled. Also suppose that for one kind or quantity of material it is desired that the washing machine should be run for ten minutes, and that for a finer or more delicate material, it is desired the machine should be stopped at the end of three minutes, so as to avoid injury to the more delicate fabric. In such cases, the port 70 could be closed by a valve 72 (see Fig. 3) having its stem 73 extended through the face plate and accessible to the operator.

The valve stem 73 may be provided with a pointer 74, which co-operates with devices indicative of the different periods it is desired the machine should operate.

In the present instance, the face plate is shown as provided with the letters S. I. and L. I.—indicative of the short interval and the long interval, and said letters may be arranged so that when the pointer registers with the letters L. I. as shown in Fig. 1, the port 70 will be closed by the valve 72, and when the pointer registers with the letters S. I. the port 70 will be opened by the valve 72.

From the above description, it will be seen that the apparatus is simple, inexpensive, and yet reliable in operation.

One embodiment of the invention is herein shown, but it is not desired to limit the invention to the particular construction shown.

What is claimed is:

1. In an apparatus of the character described, in combination, a cylinder, a piston located therein and provided with a hollow piston rod, a valve located in said hollow piston rod for controlling the passage of fluid out of the cylinder through said hollow piston rod, a device actuated by movement of the piston into one position in one period of time, and means for controlling the admission of fluid into said cylinder to permit a longer period of time to elapse before the piston becomes effective to permit the said device to be moved into another position by movement of said piston into another position.

2. In combination, a cylinder, a piston located therein and provided with a hollow piston rod, a valve located in said hollow piston rod and movable therein for controlling the passage of fluid out of the cylinder through said hollow piston rod, and an adjustable valve carried by said hollow piston rod for controlling admission of fluid into the said cylinder.

3. In an apparatus of the character described, in combination, a cylinder, a piston located therein and provided with a hollow piston rod having therein a valve seat, a valve co-operating with said seat, a spring within said hollow piston rod acting on said valve to seat the same, said valve having a hollow stem forming an air inlet into said hollow piston rod and said cylinder and co-operating with the hollow piston rod to form an air outlet passage for said cylinder, a screw in threaded engagement with said hollow valve stem and provided with a passage for air into said hollow valve stem, and a device carried by said hollow valve stem and co-operating with the hollow piston rod to effect movement of the piston in one direction in said cylinder.

4. In an apparatus of the character described, in combination, a cylinder, a piston located therein and provided with a hollow piston rod having therein a valve seat, a valve co-operating with said seat, a spring within said hollow piston rod acting on said valve to seat the same, said valve having a hollow stem forming an air inlet into said hollow piston rod and said cylinder and co-operating with the hollow piston rod to form an air outlet passage for said cylinder, and means carried by said hollow valve stem for controlling the admission of air into said cylinder through said hollow valve stem.

In testimony whereof, I have signed my name to this specification.

CARL E. SUNDBERG.